United States Patent
Dai

(10) Patent No.: US 9,888,395 B2
(45) Date of Patent: Feb. 6, 2018

(54) METHOD AND APPARATUS FOR CELL CONFIGURATION

(71) Applicant: Huawei Technologies Co., Ltd., Shenzhen, Guangdong (CN)

(72) Inventor: Jianshe Dai, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/196,963

(22) Filed: Jun. 29, 2016

(65) Prior Publication Data

US 2016/0309350 A1    Oct. 20, 2016

Related U.S. Application Data

(63) Continuation of application No. PCT/CN2014/086829, filed on Sep. 18, 2014.

(30) Foreign Application Priority Data

Dec. 30, 2013 (CN) .......................... 2013 1 0746977

(51) Int. Cl.
*H04W 24/02* (2009.01)
*H04W 28/08* (2009.01)
(Continued)

(52) U.S. Cl.
CPC .......... *H04W 24/02* (2013.01); *H04B 17/318* (2015.01); *H04B 17/345* (2015.01);
(Continued)

(58) Field of Classification Search
CPC ... H04B 17/318; H04B 17/345; H04W 16/10; H04W 16/24; H04W 16/32; H04W 24/02;
(Continued)

(56) References Cited

U.S. PATENT DOCUMENTS

| 2010/0081439 A1 | 4/2010 | Sie et al. |
| 2010/0222106 A1* | 9/2010 | Wang .................. H04B 7/0686 455/562.1 |

(Continued)

FOREIGN PATENT DOCUMENTS

| CN | 101399588 A | 4/2009 |
| CN | 102340783 A | 2/2012 |

(Continued)

OTHER PUBLICATIONS

Karthikeyan Sundaresan et al., "FluidNet: A Flexible Cloud-based Radio Access Network for Small Cells", Sep. 30, 2013, 12 pages.

*Primary Examiner* — Thai Vu

(57) ABSTRACT

Embodiments of this application provide a control method and apparatus. The method includes: determining, by a baseband unit BBU when the BBU determines that network quality of a first cell of multiple cells within coverage of the BBU decreases, load information of the first cell; when load of the first cell is less than or equal to a first load threshold, determining, according to signal strength of all remote radio units RRUs, a second cell, having the strongest signal interference to the first cell, of neighboring cells of the first cell; and combining an RRU of the first cell with an RRU of the second cell to obtain a combined cell. The embodiments of this application improve network quality and improve user network experience.

8 Claims, 7 Drawing Sheets

---

When determining that network quality of a first cell of multiple cells within coverage of a BBU decreases, the BBU determines load information of the first cell — 101

When load of the first cell is less than or equal to a first load threshold, determine, according to signal strength of all RRUs, a second cell, having the strongest signal interference to the first cell, of neighboring cells of the first cell — 102

Combine an RRU of the first cell with an RRU of the second cell to obtain a combined cell — 103

(51) Int. Cl.
 *H04W 28/02* (2009.01)
 *H04B 17/318* (2015.01)
 *H04B 17/345* (2015.01)
 *H04W 16/24* (2009.01)
 *H04W 24/08* (2009.01)

(52) U.S. Cl.
 CPC ....... *H04W 16/24* (2013.01); *H04W 28/0236* (2013.01); *H04W 28/0284* (2013.01); *H04W 28/08* (2013.01); *H04W 24/08* (2013.01)

(58) Field of Classification Search
 CPC ............. H04W 24/08; H04W 28/0236; H04W 28/0284; H04W 28/08; H04W 88/085; H04L 5/0035
 See application file for complete search history.

(56) References Cited

U.S. PATENT DOCUMENTS

| | | | |
|---|---|---|---|
| 2013/0322235 | A1 | 12/2013 | Khoryaev et al. |
| 2015/0087324 | A1* | 3/2015 | Ishida .................. H04W 16/00 455/452.2 |
| 2015/0288562 | A1* | 10/2015 | Nammi ................. H04W 24/02 370/254 |

FOREIGN PATENT DOCUMENTS

| | | |
|---|---|---|
| CN | 102916754 A | 2/2013 |
| CN | 103297978 A | 9/2013 |
| CN | 103841582 A | 6/2014 |
| EP | 2611229 A1 | 7/2013 |
| JP | 2015515842 A | 5/2015 |
| WO | 2013/112082 A1 | 8/2013 |
| WO | 2013123494 A1 | 8/2013 |
| WO | 2013180955 A1 | 12/2013 |

* cited by examiner

METHOD AND APPARATUS FOR CELL CONFIGURATION

CROSS-REFERENCE TO RELATED APPLICATIONS

This application is a continuation of International Application No. PCT/CN2014/086829, filed on Sep. 18, 2014, which claims priority to Chinese Patent Application No. 201310746977.3, filed on Dec. 30, 2013, both of which are herein incorporated by reference in their entireties.

TECHNICAL FIELD

This application relates to the field of communications technologies, and in particular, to a control method and apparatus.

BACKGROUND

With development of mobile data services, problems such as signal coverage and network capacities have become growing concerns of mobile network operators.

In the prior art, a multi-channel baseband unit (BBU)+remote radio unit (RRU) networking solution can rapidly and effectively resolve a problem such as deep network coverage. The BBU has a baseband resource sharing function and the RRU is responsible for signal sending and receiving functions, so as to implement communication between a wireless network system and a mobile station.

Generally, the BBU and the RRU are connected by using an optical fiber. One BBU may support multiple RRUs, and multiple RRUs may form one cell or multiple cells. During network deployment, an appropriate quantity of RRUs may be selected to form a cell.

However, in a process of implementing the present invention, It is found that as network services change, an RRU of a cell may not be able to meet requirements of the network services, thereby affecting network quality and reducing user network experience.

SUMMARY

This application provides a control method and apparatus, so as to improve network quality and improve user network experience.

To achieve the foregoing objective, this application provides the following technical solutions:

A first aspect provides a control method, including:

determining, by a baseband unit (BBU) when the BBU determines that network quality of a first cell of multiple cells within coverage of the BBU decreases, load information of the first cell;

when load of the first cell is less than or equal to a first load threshold, determining, according to signal strength of remote radio units (RRUs), a second cell, having the strongest signal interference to the first cell, of neighboring cells of the first cell; and combining an RRU of the first cell with an RRU of the second cell to obtain a combined cell.

In a first possible implementation manner of the first aspect, the method further includes:

when the load of the first cell is greater than or equal to a second load threshold, splitting the first cell according to the signal strength of the remote radio units RRUs, to obtain multiple split cells each including at least one RRU, so that load of the split cell is less than the second load threshold, where the second load threshold is greater than the first load threshold.

With reference to the first aspect or the first possible implementation manner of the first aspect, a second possible implementation manner of the first aspect is further provided, where the combining an RRU of the first cell with an RRU of the second cell includes:

when a sum of the load of the first cell and load of the second cell is less than the second load threshold, combining all RRUs of the second cell with the first cell; and when the sum of the load of the first cell and load of the second cell is greater than or equal to the second load threshold, combining at least one RRU, whose load plus the load of the first cell is less than the second load threshold and which has strong signal interference to the first cell, of the second cell with the first cell.

With reference to the second possible implementation manner of the first aspect, a third possible implementation manner of the first aspect is further provided, where the combining at least one RRU, whose load plus the load of the first cell is less than the second load threshold and which has strong signal interference to the first cell, of the second cell with the first cell includes:

combining an RRU, whose load plus the load of the first cell is less than the second load threshold and which has the strongest signal interference to the first cell, of the second cell with the first cell; and repeatedly performing an operation of combining an RRU of remaining RRUs of the second cell with the first cell, where a sum of load of the RRU and load of the first cell combined with an RRU is less than the second load threshold and the RRU has the strongest signal interference to the first cell combined with an RRU, until a sum of load of remaining RRUs of the second cell is less than or equal to the first load threshold, where the remaining RRUs of the second cell are RRUs of the second cell except an RRU that is combined with the first cell.

With reference to the first possible implementation manner of the first aspect, a fourth possible implementation manner of the first aspect is further provided, where the splitting the first cell, to obtain multiple split cells each including at least one RRU includes:

selecting and combining two RRUs of the first cell to obtain a first split cell, where a sum of load of the two RRUs is less than the second load threshold and the two RRUs have the strongest signal interference;

when a sum of load of remaining RRUs of the first cell is less than the second load threshold, using the remaining RRUs as a second split cell;

when the sum of load of the remaining RRUs of the first cell is greater than or equal to the second load threshold, combining an RRU, whose load plus load of the first split cell is less than the second load threshold and which has the strongest signal interference to the first split cell, of the remaining RRUs of the first cell with the first split cell; and repeatedly performing a step of combining an RRU of remaining RRUs of the first cell with the first split cell, where a sum of load of the RRU and load of the first split cell combined with an RRU is less than the second load threshold and the RRU has the strongest signal interference to the first split cell combined with an RRU, until a sum of load of remaining RRUs of the first cell is less than the second load threshold, where the remaining RRUs of the first cell are RRUs of the first cell except an RRU that is combined.

In a fifth possible implementation manner of the first aspect, the signal strength of all the RRUs is specifically obtained from multiple measurement reports reported by a mobile terminal, where the multiple measurement reports include measurement reports reported by multiple mobile terminals during signal measurement; and the determining a second cell, having the strongest signal interference to the first cell, of neighboring cells of the first cell includes:

calculating a ratio of signal strength of the first cell to signal strength of each neighboring cell of the first cell in each measurement report, where signal strength of a cell in each measurement report is a sum of signal strength of all RRUs belonging to the same cell in the measurement report;

accumulating a ratio of the signal strength of the first cell to signal strength of a same neighboring cell in each measurement report to obtain a sum, and using the sum as strength of signal interference between the first cell and the neighboring cell; and determining, according to strength of signal interference between the first cell and each neighboring cell, the second cell having the strongest signal interference to the first cell.

According to a second aspect, a control apparatus includes:

a load determining unit, configured to: when it is determined that network quality of a first cell of multiple cells within coverage of a BBU decreases, determine load information of the first cell;

a cell determining unit, configured to: when load of the first cell is less than or equal to a first load threshold, determine, according to signal strength of remote radio units (RRUs), a second cell, having the strongest signal interference to the first cell, of neighboring cells of the first cell; and a cell combining unit, configured to combine an RRU of the first cell with an RRU of the second cell to obtain a combined cell.

In a first possible implementation manner of the second aspect, the control apparatus further includes:

a cell splitting unit, configured to: when the load of the first cell is greater than or equal to a second load threshold, split the first cell according to the signal strength of the remote radio units RRUs, to obtain multiple split cells each including at least one RRU, so that load of the split cell is less than the second load threshold, where the second load threshold is greater than the first load threshold.

With reference to the second aspect or the first possible implementation manner of the second aspect, a second possible implementation manner of the second aspect is further provided, where the cell combining unit includes:

a first combining unit, configured to: when a sum of the load of the first cell and load of the second cell is less than the second load threshold, combine all RRUs of the second cell with the first cell; and a second combining unit, configured to: when the sum of the load of the first cell and the load of the second cell is greater than or equal to the second load threshold, combine at least one RRU, whose load plus the load of the first cell is less than the second load threshold and which has strong signal interference to the first cell, of the second cell with the first cell.

With reference to the second possible implementation manner of the second aspect, a third possible implementation manner of the second aspect is further provided, where the second combining unit includes:

a first combining subunit, configured to combine an RRU, whose load plus the load of the first cell is less than the second load threshold and which has the strongest signal interference to the first cell, of the second cell with the first cell; and a second combining subunit, configured to repeatedly perform an operation of combining an RRU of remaining RRUs of the second cell with the first cell, where a sum of load of the RRU and load of the first cell combined with an RRU is less than the second load threshold and the RRU has the strongest signal interference to the first cell combined with an RRU, until a sum of load of remaining RRUs of the second cell is less than or equal to the first load threshold, where the remaining RRUs of the second cell are RRUs of the second cell except an RRU that is combined with the first cell.

With reference to the first possible implementation manner of the second aspect, a fourth possible implementation manner of the second aspect is further provided, where the cell splitting unit includes:

a first splitting unit, configured to select and combine two RRUs of the first cell to obtain a first split cell, where a sum of load of the two RRUs is less than the second load threshold and the two RRUs have the strongest signal interference;

a second splitting unit, configured to: when a sum of load of remaining RRUs of the first cell is less than the second load threshold, use the remaining RRUs as a second split cell;

a third splitting unit, configured to: when the sum of the load of the remaining RRUs of the first cell is greater than or equal to the second load threshold, combine an RRU, whose load plus load of the first split cell is less than the second load threshold and which has the strongest signal interference to the first split cell, of the remaining RRUs of the first cell with the first split cell; and a fourth splitting unit, configured to repeatedly perform a step of combining an RRU of remaining RRUs of the first cell with the first split cell, where a sum of load of the RRU and load of the first split cell combined with an RRU is less than the second load threshold and the RRU has the strongest signal interference to the first split cell combined with an RRU, until a sum of load of remaining RRUs of the first cell is less than the second load threshold, where the remaining RRUs of the first cell are RRUs of the first cell except an RRU that is combined.

In a fifth possible implementation manner of the second aspect, the signal strength of all the RRUs is specifically obtained from multiple measurement reports reported by a mobile terminal, where the multiple measurement reports include measurement reports reported by multiple mobile terminals during signal measurement; and the cell determining unit includes:

a first calculating unit, configured to: when the load of the first cell is less than or equal to the first load threshold, calculate a ratio of signal strength of the first cell to signal strength of each neighboring cell of the first cell in each measurement report, where signal strength of a cell in each measurement report is a sum of signal strength of all RRUs belonging to the same cell in the measurement report;

a second calculating unit, configured to accumulate a ratio, of the signal strength of the first cell to signal strength of a same neighboring cell in each measurement report, calculated by the first calculating unit to obtain a sum, and use the sum as strength of signal interference between the first cell and the neighboring cell; and a cell determining subunit, configured to determine, according to strength, of signal interference between the first cell and each neighboring cell, calculated by the second calculating unit, the second cell having the strongest signal interference to the first cell.

Based on the above, this application provides the control method and apparatus, where when determining that network quality of a first cell within coverage of a baseband unit decreases, the baseband unit determines load information of the first cell, and when load of the first cell is less than or equal to a first load threshold, the baseband unit first determines a second cell, having the strongest signal interference to the first cell, of neighboring cells of the first cell, so as to select an RRU of the second cell and combine the RRU with the first cell to obtain a combined cell. When load of the combined cell is less than or equal to the first load threshold, the combined cell may also be determined as the first cell, so that an RRU is further combined until load of a combined cell is greater than the first load threshold. An RRU of a cell having the strongest signal interference is selected as an RRU to be combined, so that interference between cells can be reduced by means of RRU combination, thereby ensuring balance between load and interference, improving network quality, and improving user network experience.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely the embodiments of this application, and a person of ordinary skill in the art may still derive other drawings from these accompanying drawings without creative efforts.

DETAILED DESCRIPTION

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

One of main ideas of this application may include:

When a baseband unit determines that network quality of a first cell within coverage of the baseband unit decreases, the baseband unit determines load information of the first cell; and when the load of the first cell is less than or equal to a first load threshold, the baseband unit determines a second cell, having the strongest signal interference to the first cell, of neighboring cells of the first cell, so as to select an RRU of the second cell and combine the RRU with the first cell to obtain a combined cell. When load of the combined cell is less than or equal to the first load threshold, the combined cell may also be determined as the first cell, so that RRU combination continues until load of a combined cell is greater than the first load threshold. An RRU of a cell having the strongest signal interference is selected as an RRU to be combined, so that interference between cells is reduced by means of RRU combination, thereby ensuring balance between load and interference, improving network quality, and improving user network experience.

Figure 1:
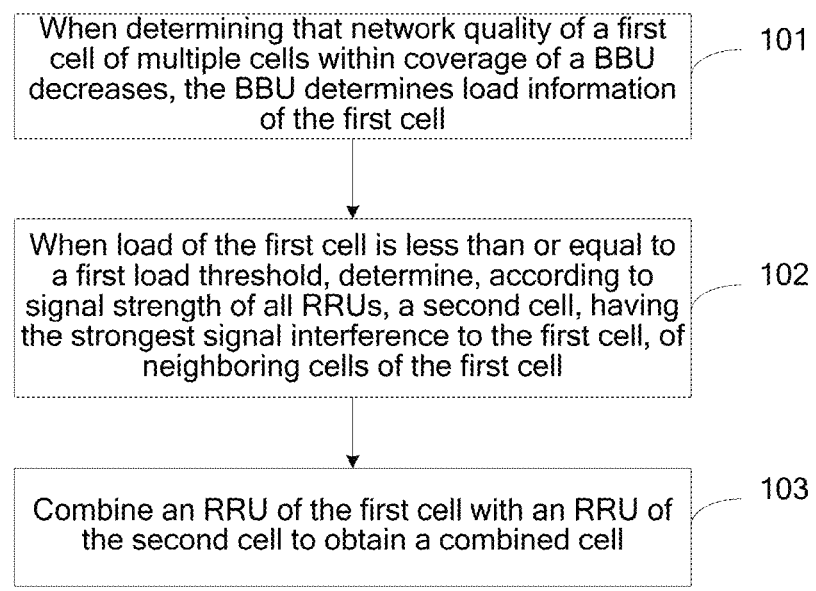
FIG. 1 is a flowchart of an embodiment of a control method according to an embodiment of this application.

FIG. 1 is a flowchart of an embodiment of a control method according to an embodiment of this application, and the method may include several steps:

101: When determining that network quality of a first cell of multiple cells within coverage of a baseband unit (BBU) decreases, the BBU determines load information of the first cell.

The BBU may determine network quality and load of a cell according to traffic statistics information of the cell. The traffic statistics information may include information such as a call drop rate, a handover success rate, a quantity of handovers, load, and spectral efficiency. It may be determined according to the traffic statistics information whether a key performance indicator (KPI) such as the call drop rate or the handover success rate is below a threshold value, so that it can be determined whether the network quality decreases.

The first cell in this embodiment of this application refers to any cell of the multiple cells.

This embodiment of this application is mainly applied to an application scenario of a multi-channel BBU+remote radio unit (RRU) networking solution, where one BBU supports multiple RRUs, and this embodiment is especially applicable to indoor network coverage.

102: When load of the first cell is less than or equal to a first load threshold, determine, according to signal strength of RRUs, a second cell, having the strongest signal interference to the first cell, of neighboring cells of the first cell.

In a process of implementing the present invention, it is found that network quality usually decreases when interference between cells is strong and load of a cell is excessively high. Therefore, when network quality decreases, an RRU of a cell may be adjusted according to load information of the cell, so as to reduce interference between cells and improve the network quality.

The signal strength of the RRUs may be obtained by means of measurement by a mobile terminal.

In this embodiment, the load of the first cell is compared with the first load threshold, and if the load of the first cell is less than or equal to the first load threshold, interference between cells can be reduced and user experience may be improved in a manner of combining an RRU.

The first load threshold gives a minimum value of load that a cell can bear.

Specifically, in this embodiment of this application, a cell, having the strongest interference to the first cell, of the neighboring cells of the first cell may be determined firstly, and for ease of description, the cell is defined as a second cell.

There is signal interference between neighboring cells, and each cell includes an RRU. Therefore, strength of signal interference may be determined according to signal strength of RRUs of cells.

In a possible implementation manner, when signal strength of a neighboring cell is greater, interference to the first cell may be stronger. Therefore, the second cell having the strongest signal interference to the first cell may be determined, that is, the second cell is a cell, having maximum signal strength, of the neighboring cells of the first cell.

103: Combine an RRU of the first cell with an RRU of the second cell to obtain a combined cell.

After the second cell is determined, the RRU of the first cell and the RRU of the second cell may be combined to form a new cell, that is, the combined cell. Because the first cell is combined with the RRU of the second cell having the strongest signal interference to the first cell, interference between the combined cell and another cell is reduced, thereby improving user experience.

The RRU of the second cell that is combined with the RRU of the first cell may be all RRUs of the second cell or some RRUs of the second cell. To further reduce the signal interference, an RRU having relatively strong signal interference to the first cell may be specifically selected from the second cell.

Certainly, as a possible case in actual application, load of a combined cell obtained by combining the first cell with all RRUs of the second cell may be still less than or equal to the first load threshold. In this case, the combined cell is determined as the first cell, and operations of step 101 to step 103 are performed repeatedly until load of a combined cell finally obtained is greater than the first load threshold.

When the load of the combined cell is greater than the first load threshold, an operation such as parameter configuration may be performed on the combined cell, so as to make the combined cell applicable.

In this embodiment, when network quality of a first cell decreases and load of the first cell is less than or equal to a first load threshold, a second cell, having the strongest signal interference to the first cell, of neighboring cells of the first cell is determined first, so that an RRU of the second cell is selected and combined with the first cell to obtain a combined cell. A baseband unit may use the combined cell as the first cell and detect whether load of the combined cell is less than or equal to the first load threshold, so as to further combine an RRU until load of a combined cell is greater than the first load threshold. An RRU of a cell having the strongest signal interference is selected as an RRU to be combined, so that interference between cells can be reduced by means of RRU combination, thereby ensuring balance between load and interference, improving network quality, and improving user network experience.

Figure 2:
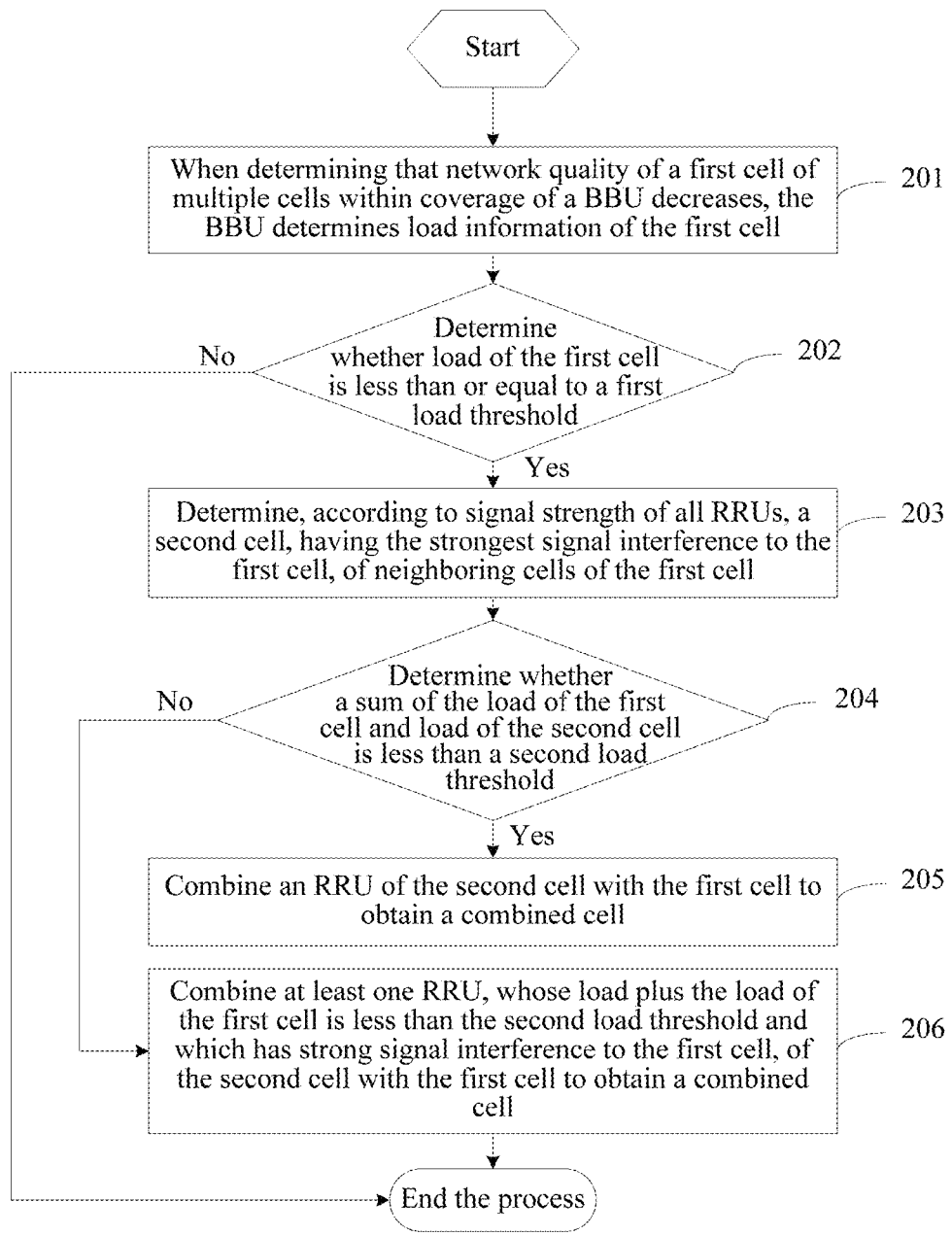
FIG. 2 is a flowchart of another embodiment of a control method according to an embodiment of this application.

FIG. 2 is a flowchart of another embodiment of a control method according to an embodiment of this application, and the method may include several steps:

201: When determining that network quality of a first cell of multiple cells within coverage of a BBU decreases, the BBU determines load information of the first cell.

202: Determine whether load of the first cell is less than or equal to a first load threshold, and if the load of the first cell is less than or equal to the first load threshold, perform step 203, or if the load of the first cell is greater than the first load threshold, end the process.

203: Determine, according to signal strength of RRUs, a second cell, having the strongest signal interference to the first cell, of neighboring cells of the first cell.

As a possible implementation manner, the signal strength of the RRUs may be obtained by triggering a mobile terminal to perform measurement, and a measurement result may be carried in a measurement report (MR) and reported by the mobile terminal. Therefore, the signal strength of the RRUs may be obtained from multiple measurement reports reported by the mobile terminal.

The multiple measurement reports may include measurement reports obtained by means of measurement by multiple mobile terminals. When multiple mobile terminals are included, the multiple measurement reports include measurement reports that the mobile terminals may obtain when the mobile terminals perform measurement separately in different locations within a measure time period.

Each measurement report includes the signal strength of the RRUs obtained by measurement, where RRUs included in measurement reports obtained by measurement indifferent locations are different, and RRUs included in measurement reports obtained by means of measurement by different mobile terminals may also be different.

Therefore, signal strength of each cell may be obtained by statistics collection according to the signal strength of the RRUs in multiple measurement reports, so that strength of signal interference between RRUs, between an RRU and a cell, and between cells may be determined.

For ease of understanding, it is assumed that a quantity of the multiple measurement reports is specifically n, and the BBU supports m RRUs, where m and n are both positive integers. The signal strength of the RRUs separately obtained by measurement in the multiple measurement reports may be represented by using Table 1:

TABLE 1

|  | $RRU_1$ | $RRU_2$ | ... | $RRU_j$ | ... | $RRU_m$ |
| --- | --- | --- | --- | --- | --- | --- |
| $MR_1$ | $a_{11}$ | $a_{12}$ | ... | $a_{1j}$ | ... | $a_{1m}$ |
| $MR_2$ | $a_{21}$ | $a_{22}$ | ... | $a_{2j}$ | ... | $a_{2m}$ |
| ... | ... | ... | ... | ... | ... | ... |
| $MR_i$ | $a_{i1}$ | $a_{i2}$ | ... | $a_{ij}$ | ... | $a_{im}$ |
| ... | ... | ... | ... | ... | ... | ... |
| $MR_n$ | $a_{n1}$ | $a_{n2}$ | ... | $a_{nj}$ | ... | $a_{nm}$ |

In Table 1, $m \geq 3$, $1 \leq j \leq m$, $n \geq 1$, and $1 \leq i \leq n$. $a_{ij}$ indicates signal strength of an $RRU_j$ measured in a measurement report $MR_i$. When n is larger, determined strength of signal interference is more accurate. When the signal strength of the RRU is not detected in the measurement report $MR_i$, $a_{ij}$ is 0.

Strength of signal interference between RRUs, between an RRU and a cell, and between cells may be calculated according to the signal strength of all the RRUs obtained by measurement in the multiple measurement reports.

As a possible implementation manner:

strength of signal interference between any two RRUs may be a sum of ratios between signal strength of the two RRUs that are detected simultaneously; for example, in Table 1, strength of signal interference of an $RRU_l$ to an $RRU_k$ is:

$$I_{lk} = \sum_{i=1}^{n} \frac{a_{il}}{a_{ik}},$$

where if signal strength of the two RRUs is not detected in the measurement reports, the strength of signal interference is 0.

For strength of signal interference between an RRU and a cell, a ratio of signal strength of the RRU to signal strength of the cell in each measurement report may be calculated first, and a sum of all ratios is then calculated, where the signal strength of the cell is a sum of signal strength of all RRUs belonging to the cell in the measurement report. For example, a cell A includes an $RRU_l$, an $RRU_p$, and an $RRU_q$, and strength of signal interference between the $RRU_q$ and the cell A is:

$$I_{k,CellA} = \sum_{i=1}^{n} \frac{a_{ik}}{a_{il} + a_{ip} + a_{iq}}.$$

For a strength of signal interference between cells, a ratio of signal strength of signals between the cells in each measurement report may be calculated first, and a sum of all ratios is then calculated. For example, a cell A includes an $RRU_l$, an $RRU_p$, and an $RRU_q$, a cell B includes an $RRU_x$, an $RRU_y$, and an $RRU_z$, and strength of signal interference between the cell A and the cell B is:

$$I_{CellA,CellB} = \sum_{i=1}^{n} \frac{a_{il} + a_{ip} + a_{iq}}{a_{ix} + a_{iy} + a_{iz}}.$$

Manners of calculating a strength of signal interference between multiple RRUs and between multiple RRUs and a cell are the same as the foregoing manner.

Therefore, a neighboring cell having the strongest interference to the first cell may be determined according to the signal strength of the RRUs in the multiple measurement reports. For example, neighboring cells of a cell B include a cell A, a cell C, and a cell D, and strength of signal interference between each neighboring cell and the cell B is calculated according to the above, and a cell having the largest value of strength of signal interference is the second cell.

As a possible implementation manner, there may be multiple neighboring cells having the strongest signal interference to the first cell, that is, two neighboring cells have equal strength of signal interference to the first cell and the equal strength is greater than strength of signal interference between another neighboring cell and the first cell. In this case, a cell having a larger quantity of RRUs may be selected and used as the second cell.

204: Determine whether a sum of the load of the first cell and load of the second cell is less than a second load threshold, and if the sum of the load of the first cell and the load of the second cell is less than the second load threshold, perform step 205, or if the sum of the load of the first cell and the load of the second cell is greater than or equal to the second load threshold, perform step 206.

205: Combine an RRU of the first cell with an RRU of the second cell to obtain a combined cell.

The second load threshold is greater than the first load threshold, where the second load threshold limits a maximum value of load that a cell can carry, and if the second load threshold is exceeded, network quality of the cell may be affected.

If load of the combined cell is still less than or equal to the first load threshold, the combined cell may be determined as the first cell again, so that the process may return to step 202 and continue.

206: Combine at least one RRU, whose load plus the load of the first cell is less than the second load threshold and which has strong signal interference to the first cell, of the second cell with all RRUs of the first cell to obtain a combined cell.

If the sum of the load of the first cell and the load of the second cell is greater than or equal to the second load threshold, only some RRUs of the second cell may be selected and combined with the first cell.

RRUs, each of which has relatively strong signal interference to the first cell and whose load plus the load of the first cell is less than the second load threshold, may be selected as the some RRUs of the second cell. For strength of signal interference between an RRU and the first cell, refer to the description of step 203, so as to improve accuracy of calculation.

As a possible implementation manner, step 206 may include:

combining an RRU, whose load plus the load of the first cell is less than the second load threshold and which has the strongest signal interference to the first cell, of the second cell with the first cell; and repeatedly performing an operation of combining an RRU of remaining RRUs of the second cell with the first cell, where a sum of load of the RRU and load of the first cell combined with an RRU is less than the second load threshold and the RRU has the strongest signal interference to the first cell combined with an RRU, until a sum of load of remaining RRUs of the second cell is less than or equal to the first load threshold, where the remaining RRUs of the second cell are RRUs of the second cell except an RRU that is combined with the first cell.

That is, an RRU having the strongest signal interference is first selected and combined with the first cell. It is then determined whether a sum of load of remaining RRUs of the second cell is greater than the first load threshold:

if the sum of the load of the remaining RRUs of the second cell is less than or equal to the first load threshold, the first cell after the combination is used as a combined cell, and the remaining RRUs of the second cell form a new cell, and both the combined cell and the new cell may be used as the first cell, so that the process may return to step 202 and continue; and if the sum of the load of the remaining RRUs of the second cell is greater than the first load threshold, an RRU of the remaining RRUs of the second cell continues to be selected and combined with the first cell, where a sum of load of the RRU and load of the first cell combined with an RRU is less than the second load threshold and the RRU has the strongest signal interference to the first cell combined with an RRU, until a sum of load of remaining RRUs of the second cell is less than or equal to the first load threshold, so that a final first cell after combination is used as a combined cell, the remaining RRUs of the second cell form a new cell, and the combined cell and the new cell may also be determined as the first cell, so that the process may return to step 202 and continue.

In this embodiment, when network quality of a first cell decreases and load of the first cell is less than or equal to a first load threshold, a second cell, having the strongest signal interference to the first cell, of neighboring cells of the first cell is determined first, so that when a sum of the load of the first cell and load of the second cell is less than a second load threshold, the first cell may be combined with an RRU of the second cell; and when the sum of the load of the first cell and the load of the second cell is greater than or equal to the second load threshold, some RRUs, each of which has strong signal interference to the first cell and whose load plus the load of the first cell is less than the second load threshold, may be selected from the second cell and combined with the first cell to obtain a combined cell. Load of the combined cell is increased, and the combined cell may be used as the first cell again. When the load of the combined cell is less than or equal to the first load threshold, an RRU may continue to be combined until load of a combined cell is greater than the first load threshold. An RRU of a cell having the strongest signal interference is selected as an RRU to be combined, so that interference between cells is reduced by means of RRU combination, thereby ensuring balance between load and interference, improving network quality, and improving user network experience.

Figure 3:
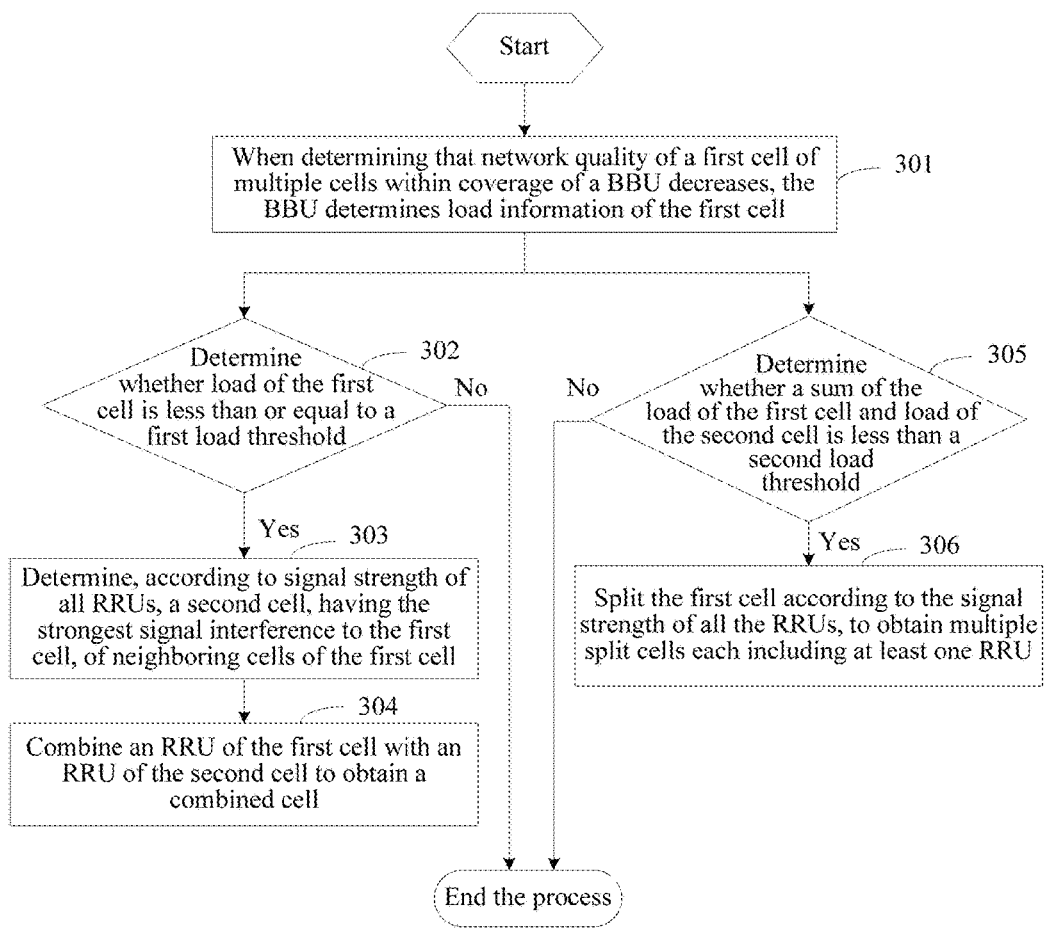
FIG. 3 is a flowchart of still another embodiment of a control method according to an embodiment of this application.

FIG. 3 is a flowchart of another embodiment of a control method according to an embodiment of this application, and the method may include the following steps:

301: When determining that network quality of a first cell of multiple cells within coverage of a BBU decreases, the BBU determines load information of the first cell.

302: Determine whether load of the first cell is less than or equal to a first load threshold, and if the load of the first cell is less than or equal to the first load threshold, perform step 303, or if the load of the first cell is greater the first load threshold, end the process.

303: Determine, according to signal strength of RRUs, a second cell, having the strongest signal interference to the first cell, of neighboring cells of the first cell.

The signal strength of the RRUs is specifically obtained from multiple measurement reports reported by a mobile terminal, where the multiple measurement reports include measurement reports reported by multiple mobile terminals during signal measurement The determining a second cell, having the strongest signal interference to the first cell, of neighboring cells of the first cell may specifically include:

calculating a ratio of signal strength of the first cell to signal strength of each neighboring cell of the first cell in each measurement report, where signal strength of a cell in each measurement report is a sum of signal strength of all RRUs belonging to the same cell in the measurement report;

accumulating a ratio of the signal strength of the first cell to signal strength of a same neighboring cell in each measurement report to obtain a sum, and using the sum as strength of signal interference between the first cell and the neighboring cell; and determining, according to strength of signal interference between the first cell and each neighboring cell, the second cell having the strongest signal interference to the first cell.

304: Combine an RRU of the first cell with an RRU of the second cell to obtain a combined cell.

The combining an RRU of the first cell with an RRU of the second cell may specifically include:

when a sum of the load of the first cell and load of the second cell is less than a second load threshold, combining all RRUs of the second cell with the first cell; and when the sum of the load of the first cell and the load of the second cell is greater than or equal to the second load threshold, combining at least one RRU, whose load plus the load of the first cell is less than the second load threshold and which has strong signal interference to the first cell, of the second cell with the first cell.

Figure 3A:
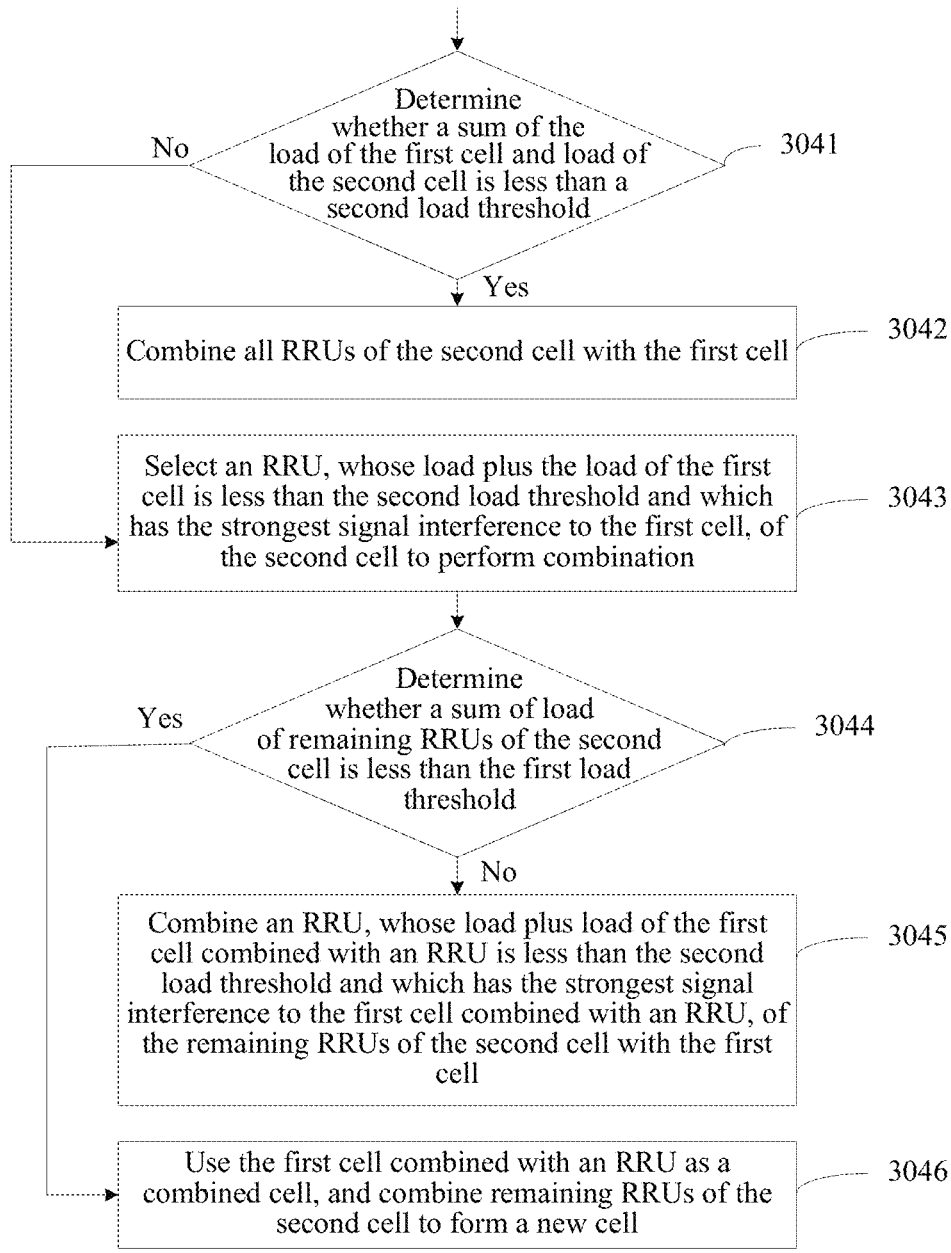
FIG. 3a is a flowchart of a manner of cell combination according to an embodiment of this application.

As a possible implementation manner, as shown in FIG. 3a, FIG. 3a is a flowchart of a manner of cell combination according to this embodiment, and step 304 may include:

3041: Determine whether a sum of the load of the first cell and load of the second cell is less than a second load threshold, and the sum of the load of the first cell and the load of the second cell is less than the second load threshold, perform step 3042, or if the sum of the load of the first cell and the load of the second cell is greater than or equal to a second load threshold, perform step 3043.

3042: Combine all RRUs of the second cell with the first cell.

3043: Select an RRU, whose load plus the load of the first cell is less than the second load threshold and which has the strongest signal interference to the first cell, of the second cell and combine the RRU with the first cell.

3044: Determine whether a sum of load of remaining RRUs of the second cell is less than or equal to the first load threshold, and if the sum of the load of the remaining RRUs of the second cell is greater than the first load threshold, perform step 3045, or if the sum of the load of the remaining RRUs of the second cell is less than or equal to the first load threshold, perform step 3046.

3045: Combine an RRU, whose load plus load of the first cell combined with an RRU is less than the second load threshold and which has the strongest signal interference to the first cell combined with an RRU, of the remaining RRUs of the second cell with the first cell, and the process returns to step 3044.

3046: Use the first cell combined with an RRU as a combined cell, and combine remaining RRUs of the second cell to form a new cell.

The combined cell and the new cell may be used as the first cell again, so that the process may return to step 302 and continue.

The remaining RRUs of the second cell are RRUs, other than an RRU that is combined with the first cell, of the second cell.

305: Determine whether the load of the first cell is greater than or equal to the second load threshold, and if the load of the first cell is greater than or equal to the second load threshold, perform step 306, or if the load of the first cell is less than the second load threshold, end the process.

The second load threshold gives a maximum value of load that the first cell can carry, and if the second load threshold is exceeded, network quality of the cell may be affected.

306: Split the first cell according to the signal strength of the RRUs, to obtain multiple split cells each including at least one RRU, so that load of the split cell is less than the second load threshold.

When the load of the first cell is greater than or equal to the second load threshold, the first cell may be split to obtain multiple split cells each including at least one RRU, so that load of the split cell may be less than the second load threshold, thereby improving network quality and improving user experience.

Figure 3B:
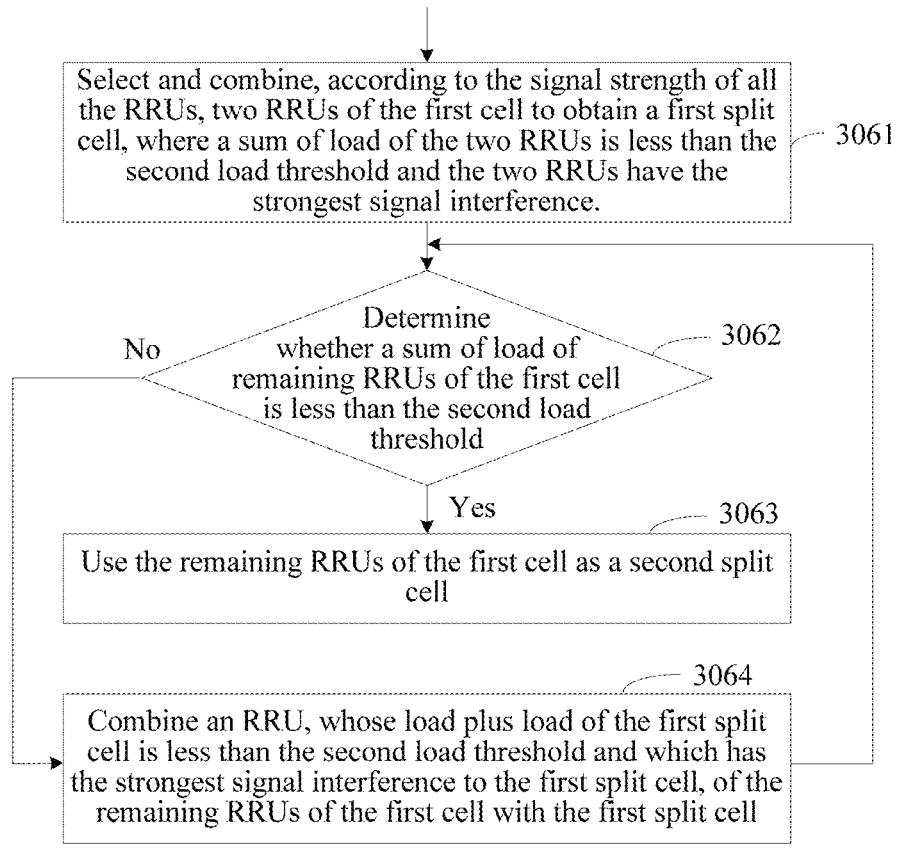
FIG. 3b is a flowchart of a manner of splitting a cell according to an embodiment of this application.

In a possible implementation manner, as shown in FIG. 3b, FIG. 3b is a flowchart of a manner of splitting a cell according to this embodiment, and step 306 may include:

3061: Select and split, according to the signal strength of all the RRUs, two RRUs of the first cell to obtain a first split cell, where a sum of load of the two RRUs is less than the second load threshold and the two RRUs have the strongest signal interference.

3062: Determine whether a sum of load of remaining RRUs of the first cell is less than the second load threshold, and if the sum of the load of remaining RRUs of the first cell is less than the second load threshold, perform step 3063, or if the sum of the load of remaining RRUs of the first cell is greater than or equal to the second load threshold, perform step 3064.

3063: Use the remaining RRUs of the first cell as a second split cell.

3064: Combine an RRU, whose load plus load of the first split cell is less than the second load threshold and which has the strongest signal interference to the first split cell, of the remaining RRUs of the first cell with the first split cell, and the process returns to step 3062 and continues.

The operation of step 3061 is performed in a case in which there are more than two RRUs of the first cell. When the first cell includes only two RRUs, the two RRUs may each form a split cell, so that the first cell is split into two split cells.

The remaining RRUs of the first cell are RRUs, other than an RRU that is combined, of the first cell.

In this embodiment, when network quality of a first cell decreases and load of the first cell is less than or equal to a first load threshold, a second cell, having the strongest signal interference to the first cell, of neighboring cells of the first cell is determined first, so that an RRU of the second cell is selected and combined with the first cell to obtain a combined cell. A baseband unit may use the combined cell as the first cell and detect whether load of the combined cell is less than or equal to the first load threshold, so as to further combine an RRU until load of a combined cell is greater than the first load threshold. When the load of the first cell is greater than or equal to a second load threshold, the first cell may be split to obtain multiple split cells each including at least one RRU, so that load of the split cell is less than the second load threshold. In this embodiment, by combining an RRU or splitting a cell, interference between cells can be reduced, thereby ensuring balance between load and interference, improving network quality, and improving user network experience.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to exemplary embodiments, and the involved actions and modules are not necessarily required by this application.

Figure 4:
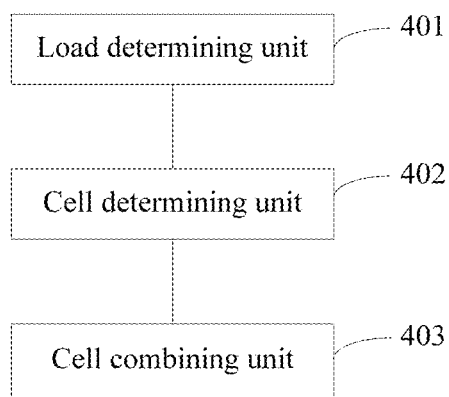
FIG. 4 is a schematic structural diagram of an embodiment of a control apparatus according to an embodiment of this application.

FIG. 4 is a schematic structural diagram of an embodiment of a control apparatus according to an embodiment of this application, and the apparatus may include:

a load determining unit 401, configured to: when it is determined that network quality of a first cell of multiple cells within coverage of a BBU decreases, determine load information of the first cell;

a cell determining unit 402, configured to: when load of the first cell is less than or equal to a first load threshold, determine, according to signal strength of remote radio units (RRUs), a second cell, having the strongest signal interference to the first cell, of neighboring cells of the first cell, where strength of signal interference of a cell may be calculated by using signal strength of all RRUs obtained by measurement in a measurement report; and a cell combining unit 403, configured to combine an RRU of the first cell with an RRU of the second cell to obtain a combined cell.

To further reduce signal interference, at least one RRU, having relatively strong signal interference to the first cell, of the second cell may be selected as the RRU of the second cell to be combined with the RRU of the first cell.

When load of the combined cell is greater than the first load threshold, an operation such as parameter configuration may be performed on the combined cell, so as to make the combined cell applicable.

In this embodiment, when network quality of a first cell within coverage of a baseband unit decreases and load of the first cell is less than or equal to a first load threshold, the baseband unit first determines a second cell, having the strongest signal interference to the first cell, of neighboring cells of the first cell, so as to select an RRU of the second cell and combine the RRU with the first cell to obtain a combined cell, thereby improving load of a cell. The combined cell may be determined as the first cell again. When load of the combined cell is less than or equal to the first load threshold, an RRU may be further combined until load of a combined cell is greater than the first load threshold. An RRU of a cell having the strongest signal interference is selected as an RRU to be combined, so that interference between cells is reduced by means of RRU combination, thereby ensuring balance between load and interference, improving network quality, and improving user network experience.

Figure 5:
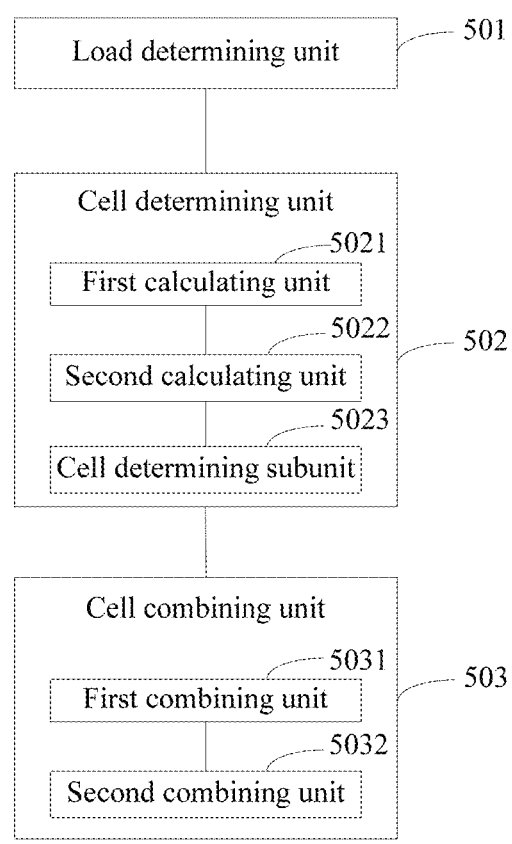
FIG. 5 is a schematic structural diagram of another embodiment of a control apparatus according to an embodiment of this application.

FIG. 5 is a schematic structural diagram of another embodiment of a control apparatus according to an embodiment of this application, and the apparatus may include:

a load determining unit 501, configured to: when it is determined that network quality of a first cell of multiple cells within coverage of a BBU decreases, determine load information of the first cell; and a cell determining unit 502, configured to: when load of the first cell is less than or equal to a first load threshold, determine, according to signal strength of RRUs, a second cell, having the strongest signal interference to the first cell, of neighboring cells of the first cell.

As a possible implementation manner, the signal strength of the RRUs may be obtained by triggering a mobile terminal to perform measurement, and a measurement result may be carried in a measurement report and reported by the mobile terminal. Therefore, the signal strength of the RRUs may be obtained from multiple measurement reports reported by the mobile terminal.

The cell determining unit 502 may include:

a first calculating unit 5021, configured to: when the load of the first cell is less than or equal to the first load threshold, calculate a ratio of signal strength of the first cell to signal strength of each neighboring cell of the first cell in each measurement report, where signal strength of a cell in each measurement report is a sum of signal strength of all RRUs belonging to the same cell in the measurement report;

a second calculating unit 5022, configured to accumulate a ratio, of the signal strength of the first cell to signal strength of a same neighboring cell in each measurement report, calculated by the first calculating unit to obtain a sum, and use the sum as strength of signal interference between the first cell and the neighboring cell; and a cell determining subunit 5023, configured to determine, according to strength, of signal interference between the first cell and each neighboring cell, calculated by the second calculating unit, the second cell having the strongest signal interference to the first cell.

A cell combining unit 503 is configured to combine an RRU of the first cell with an RRU of the second cell to obtain a combined cell.

The cell combining unit 503 specifically includes:

a first combining unit 5031, configured to: when a sum of the load of the first cell and load of the second cell is less than a second load threshold, combine all RRUs of the second cell with the first cell, where the second load threshold is greater than the first load threshold, the second load threshold limits a maximum value of load that a cell can carry, and if the second load threshold is exceeded, network quality of the cell may be affected; and a second combining unit 5032, configured to: when the sum of the load of the first cell and the load of the second cell is greater than or equal to the second load threshold, combine at least one RRU, whose load plus the load of the first cell is less than the second load threshold and which has strong signal interference to the first cell, of the second cell with the first cell.

If the sum of the load of the first cell and the load of the second cell is greater than or equal to the second load threshold, only some RRUs of the second cell may be selected and combined with the first cell.

RRUs, each of which has relatively strong signal interference to the first cell and whose load plus the load of the first cell is less than the second load threshold, may be selected as the some RRUs of the second cell.

In this embodiment, when network quality of a first cell within coverage of a baseband unit decreases and load of the first cell is less than or equal to a first load threshold, a second cell, having the strongest signal interference to the first cell, of neighboring cells of the first cell is determined first, so that when a sum of the load of the first cell and load of the second cell is less than a second load threshold, the first cell may be combined with an RRU of the second cell; and when the sum of the load of the first cell and the load of the second cell is greater than or equal to the second load threshold, some RRUs, each of which having strong signal interference to the first cell and whose load plus the load of the first cell is less than the second load threshold, may be selected from the second cell and combined with the first cell to obtain a combined cell. Load of the combined cell is increased, and when the load of the combined cell is less than or equal to the first load threshold, the combined cell may be used as the first cell again, so that an RRU may continue to be combined until load of a combined cell is greater than the first load threshold. An RRU of a cell having the strongest signal interference is selected as an RRU to be combined, so that interference between cells is reduced by means of RRU combination, thereby ensuring balance between load and interference, improving network quality, and improving user network experience.

Figure 6:
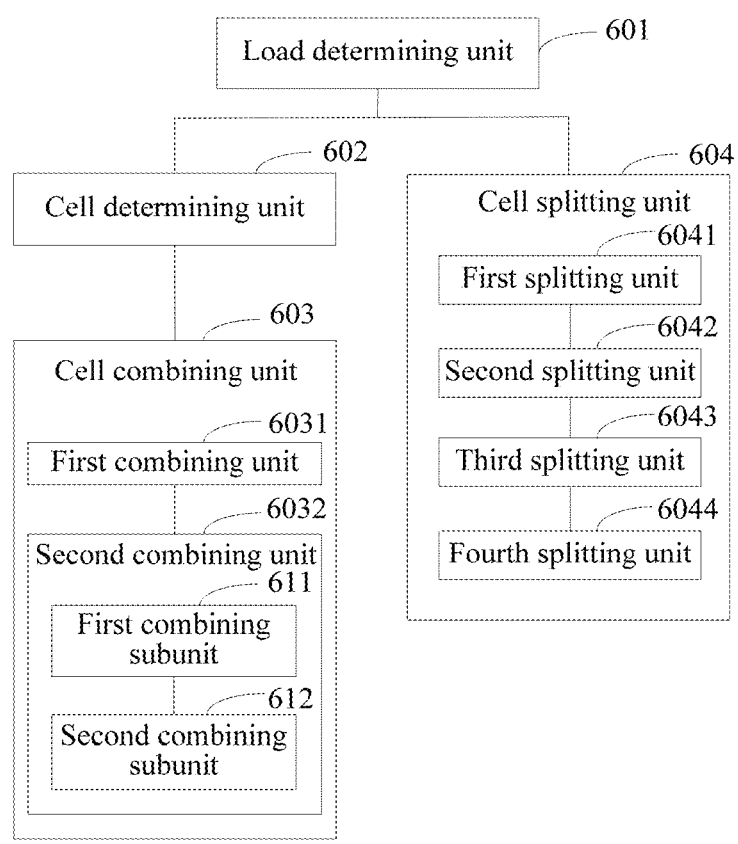
FIG. 6 is a schematic structural diagram of still another embodiment of a control apparatus according to an embodiment of this application.

FIG. 6 is a schematic structural diagram of another embodiment of a control apparatus according to an embodiment of this application, and the apparatus may include:

a load determining unit 601, configured to: when it is determined that network quality of a first cell of multiple cells within coverage of a BBU decreases, determine load information of the first cell; and a cell determining unit 602, configured to: when load of the first cell is less than or equal to a first load threshold, determine, according to signal strength of remote radio units (RRUs), a second cell, having the strongest signal interference to the first cell, of neighboring cells of the first cell.

The signal strength of the RRUs may be obtained by triggering a mobile terminal to perform measurement, and a measurement result may be carried in a measurement report and reported by the mobile terminal. Therefore, the signal strength of the RRUs may be obtained from multiple measurement reports reported by the mobile terminal.

The cell determining unit may include:

a first calculating unit, configured to: when the load of the first cell is less than or equal to the first load threshold, calculate a ratio of signal strength of the first cell to signal strength of each neighboring cell of the first cell in each measurement report, where signal strength of a cell in each measurement report is a sum of signal strength of all RRUs belonging to the same cell in the measurement report;

a second calculating unit, configured to accumulate a ratio, of the signal strength of the first cell to signal strength of a same neighboring cell in each measurement report, calculated by the first calculating unit to obtain a sum, and use the sum as strength of signal interference between the first cell and the neighboring cell; and a cell determining subunit, configured to determine, according to strength, of signal interference between the first cell and each neighboring cell, calculated by the second calculating unit, the second cell having the strongest signal interference to the first cell.

A cell combining unit 603 is configured to combine an RRU of the first cell with an RRU of the second cell to obtain a combined cell.

As a possible implementation manner, the cell combining unit 603 may include:

a first combining unit 6031, configured to: when a sum of the load of the first cell and load of the second cell is less than a second load threshold, combine all RRUs of the second cell with the first cell; and a second combining unit 6032, configured to: when the sum of the load of the first cell and the load of the second cell is greater than or equal to the second load threshold, combine at least one RRU, whose load plus the load of the first cell is less than the second load threshold and which has strong signal interference to the first cell, of the second cell with the first cell.

As a possible implementation manner, the second combining unit 6032 may include:

a first combining subunit 611, configured to: combine an RRU, whose load plus the load of the first cell is less than the second load threshold and which has the strongest signal interference to the first cell, of the second cell with the first cell; and a second combining subunit 612, configured to repeatedly perform an operation of combining an RRU of remaining RRUs of the second cell with the first cell, where a sum of load of the RRU and load of the first cell combined with an RRU is less than the second load threshold and the RRU has the strongest signal interference to the first cell combined with an RRU, until a sum of load of remaining RRUs of the second cell is less than the first load threshold, where the remaining RRUs of the second cell are RRUs of the second cell except an RRU that is combined with the first cell.

A final first cell after combination is used as a combined cell, remaining RRUs of the second cell form a new cell, and the combined cell and the new cell may also be determined as the first cell, so that an operation of cell combination continues to be performed.

A cell splitting unit 604 is configured to: when the load of the first cell is greater than or equal to the second load threshold, split the first cell according to the signal strength of all the remote radio units (RRUs), to obtain multiple split cells each including at least one RRU, so that load of the split cell is less than the second load threshold, where the second load threshold is greater than the first load threshold.

As a possible implementation manner, the cell splitting unit 604 may include:

a first splitting unit 6041, configured to select and combine two RRUs of the first cell to obtain a first split cell, where a sum of load of the two RRUs is less than the second load threshold and the two RRUs have the strongest signal interference;

a second splitting unit 6042, configured to: when a sum of load of remaining RRUs of the first cell is less than the second load threshold, use the remaining RRUs as a second split cell;

a third splitting unit 6043, configured to: when the sum of the load of the remaining RRUs of the first cell is greater than or equal to the second load threshold, combine an RRU, whose load plus load of the first split cell is less than the second load threshold and which has the strongest signal interference to the first split cell, of the remaining RRUs of the first cell with the first split cell; and a fourth splitting unit 6044, configured to repeatedly perform a step of combining an RRU of remaining RRUs of the first cell with the first split cell, where a sum of load of the RRU and load of the first split cell combined with an RRU is less than the second load threshold and the RRU has the strongest signal interference to the first split cell combined with an RRU, until a sum of load of remaining RRUs of the first cell is less than the second load threshold, where the remaining RRUs of the first cell are RRUs of the first cell except an RRU that is combined.

The cell splitting unit performs a splitting operation in a case in which there are more than two RRUs of the first cell. When the first cell includes only two RRUs, the two RRUs may each form a split cell, so that the first cell is split into two split cells.

In this embodiment, when network quality of a first cell within coverage of a baseband unit decreases and load of the first cell is less than or equal to a first load threshold, the baseband unit first determines a second cell, having the strongest signal interference to the first cell, of neighboring cells of the first cell, so that an RRU of the second cell is selected and combined with the first cell to obtain a combined cell. When the load of the first cell is greater than or equal to a second load threshold, the first cell may be split to obtain multiple split cells each including at least one RRU, so that load of the split cell is less than the second load threshold. In this embodiment, by combining an RRU or splitting a cell, interference between the cells may be reduced, thereby ensuring balance between load and interference, improving network quality, and improving user network experience.

In an actual application, the control apparatus shown in FIG. 4 to FIG. 6 may be applied to a BBU, and by means of deployment of the BBU of the control apparatus in this embodiment, when network quality decreases, the network quality is increased by combining an RRU or splitting a cell, and interference between cells can be reduced, balance between load and interference may be ensured, and user network experience may be improved.

Based on the foregoing description, a person skilled in the art may clearly understand that this application may be implemented by software plus a necessary universal hardware platform. An embodiment of this application further provides a schematic structural diagram of an embodiment of a baseband unit. The baseband unit includes at least a processor 701, and a memory 702 and a transmitter 703 that are separately connected to the processor 701 by using a bus.

The memory 702 stores a group of program instructions. The memory may be a high-speed RAM memory, or may be a non-volatile memory (non-volatile memory), such as at least one magnetic disk memory.

The processor 701 is configured to invoke the program instructions stored in the memory 702, to perform the following operations:

determining, when it is determined that network quality of a first cell of multiple cells within coverage of a BBU decreases, load information of the first cell;

when load of the first cell is less than or equal to a first load threshold, determining, according to signal strength of remote radio units (RRUs), a second cell, having the strongest signal interference to the first cell, of neighboring cells of the first cell; and combining an RRU of the first cell with an RRU of the second cell to obtain a combined cell.

The processor may be a central processing unit (CPU) or an application-specific integrated circuit (ASIC), or is configured as one or more integrated circuits that implement the embodiment of the present invention.

Optionally, the baseband unit may be used to perform any control method shown in FIG. 1 to FIG. 3 according to the embodiments of this application.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

Finally, it should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

For ease of description, the foregoing apparatus is described by dividing functions into various units. Certainly, during implementation of this application, the functions of each unit may be implemented in a same piece of or a plurality of pieces of software and/or hardware.

Based on the foregoing descriptions of the implementation manners, a person skilled in the art may clearly understand that this application may be implemented by software in addition to a necessary general hardware platform. Based on such an understanding, the technical solutions of this application essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of this application.

The foregoing description of the disclosed embodiments enables a person skilled in the art to implement or use this application. Various modifications to the embodiments are obvious to the person skilled in the art, and general principles defined in this specification may be implemented in other embodiments without departing from the spirit or scope of this application. Therefore, this application will not be limited to the embodiments described in this specification but extends to the widest scope that complies with the principles and novelty disclosed in this specification.

What is claimed is:

1. A control method, comprising:
   determining, by a baseband unit (BBU) when the BBU determines that network quality of a first cell of multiple cells within coverage of the BBU decreases, load information of the first cell;
   when a load of the first cell is less than or equal to a first load threshold, determining, according to signal strength of remote radio units (RRUs), a second cell, having the strongest signal interference to the first cell, of neighboring cells of the first cell; and
   combining an RRU of the first cell with an RRU of the second cell to obtain a combined cell, wherein combining an RRU of the first cell with an RRU of the second cell comprises:
      when the sum of the load of the first cell and a load of the second cell is greater than or equal to a second load threshold, combining at least one RRU, whose load plus the load of the first cell is less than the second load threshold and which has strong signal interference to the first cell, of the second cell with the first cell, and
      wherein combining at least one RRU, whose load plus the load of the first cell is less than the second load threshold and which has strong signal interference to the first cell, of the second cell with the first cell comprises:
         combining an RRU, whose load plus the load of the first cell is less than the second load threshold and which has the strongest signal interference to the first cell, of the second cell with the first cell; and
         repeatedly performing an operation of combining an RRU of remaining RRUs of the second cell with the first cell, wherein a sum of load of the RRU and load of the first cell combined with an RRU is less than the second load threshold and the RRU has the strongest signal interference to the first cell combined with an RRU, until a sum of load of remaining RRUs of the second cell is less than or equal to the first load threshold, wherein the remaining RRUs of the second cell are RRUs of the second cell except an RRU that is combined with the first cell.

2. The method according to claim 1, wherein combining an RRU of the first cell with an RRU of the second cell comprises:
   when a sum of the load of the first cell and a load of the second cell is less than a second load threshold, combining all RRUs of the second cell with the first cell.

3. A control method, comprising:
   determining, by a baseband unit (BBU) when the BBU determines that network quality of a first cell of multiple cells within coverage of the BBU decreases, load information of the first cell;
   when a load of the first cell is less than or equal to a first load threshold, determining, according to signal strength of remote radio units (RRUs), a second cell, having the strongest signal interference to the first cell, of neighboring cells of the first cell; and
   combining an RRU of the first cell with an RRU of the second cell to obtain a combined cell;
   when the load of the first cell is greater than or equal to a second load threshold, splitting the first cell according to the signal strength of the RRUs, to obtain multiple split cells each comprising at least one RRU, so that load of the split cell is less than the second load threshold, wherein the second load threshold is greater than the first load threshold;
   wherein splitting the first cell, to obtain multiple split cells each comprising at least one RRU comprises:
      selecting and splitting two RRUs of the first cell to obtain a first split cell, wherein a sum of load of the two RRUs is less than the second load threshold and the two RRUs the strongest signal interference;
      when a sum of load of remaining RRUs of the first cell is less than the second load threshold, using the remaining RRUs as a second split cell;
      when the sum of the load of the remaining RRUs of the first cell is greater than or equal to the second load threshold, combining an RRU, whose load plus load of the first split cell is less than the second load threshold and which has the strongest signal interference to the first split cell, of the remaining RRUs of the first cell with the first split cell; and
      repeatedly performing a step of combining an RRU of remaining RRUs of the first cell with the first split cell, wherein a sum of load of the RRU and load of the first split cell combined with an RRU is less than the second load threshold and the RRU has the strongest signal interference to the first split cell combined with an RRU, until a sum of load of remaining RRUs of the first cell is less than the second load threshold, wherein the remaining RRUs of the first cell are RRUs of the first cell except an RRU that is combined.

4. A control method, comprising:
   determining, by a baseband unit (BBU) when the BBU determines that network quality of a first cell of multiple cells within coverage of the BBU decreases, load information of the first cell;
   when a load of the first cell is less than or equal to a first load threshold, determining, according to signal strength of remote radio units (RRUs), a second cell, having the strongest signal interference to the first cell, of neighboring cells of the first cell; and
   combining an RRU of the first cell with an RRU of the second cell to obtain a combined cell; wherein:
   the signal strength of all the RRUs is obtained from multiple measurement reports reported by a mobile terminal, wherein the multiple measurement reports comprise measurement reports reported by multiple mobile terminals during signal measurement; and
   determining a second cell, having the strongest signal interference to the first cell, of neighboring cells of the first cell comprises:
      calculating a ratio of signal strength of the first cell to signal strength of each neighboring cell of the first cell in each measurement report, wherein signal strength of a cell in each measurement report is a sum of signal strength of all RRUs belonging to the same cell in the measurement report,
      accumulating a ratio of the signal strength of the first cell to signal strength of a same neighboring cell in each measurement report to obtain a sum, and using the sum as strength of signal interference between the first cell and the neighboring cell, and determining, according to strength of signal interference between the first cell and each neighboring cell, the second cell having the strongest signal interference to the first cell.

5. A control apparatus, comprising:
at least one processor and a memory coupled to the at least one processor, wherein the at least one processor is configured to:
when it is determined that network quality of a first cell of multiple cells within coverage of a baseband unit (BBU) decreases, determine load information of the first cell;
when load of the first cell is less than or equal to a first load threshold, determine, according to signal strength of remote radio units (RRUs), a second cell, having the strongest signal interference to the first cell, of neighboring cells of the first cell;
combine an RRU of the first cell with an RRU of the second cell to obtain a combined cell;
when the sum of the load of the first cell and a load of the second cell is greater than or equal to a second load threshold, combine at least one RRU, whose load plus the load of the first cell is less than the second load threshold and which has strong signal interference to the first cell, of the second cell with the first cell;
combine an RRU, whose load plus the load of the first cell is less than the second load threshold and which has the strongest signal interference to the first cell, of the second cell with the first cell; and
repeatedly perform an operation of combining an RRU of remaining RRUs of the second cell with the first cell, wherein a sum of load of the RRU and load of the first cell combined with an RRU is less than the second load threshold and the RRU has the strongest signal interference to the first cell combined with an RRU, until a sum of load of remaining RRUs of the second cell is less than or equal to the first load threshold, wherein the remaining RRUs of the second cell are RRUs of the second cell except an RRU that is combined with the first cell.

6. The apparatus according to claim 5, wherein the at least one processor is configured to:
when a sum of the load of the first cell and a load of the second cell is less than a second load threshold, combine all RRUs of the second cell with the first cell.

7. A control apparatus, comprising:
at least one processor and a memory coupled to the at least one processor, wherein the at least one processor is configured to:
when it is determined that network quality of a first cell of multiple cells within coverage of a baseband unit (BBU) decreases, determine load information of the first cell;
when load of the first cell is less than or equal to a first load threshold, determine, according to signal strength of remote radio units (RRUs), a second cell, having the strongest signal interference to the first cell, of neighboring cells of the first cell; and
combine an RRU of the first cell with an RRU of the second cell to obtain a combined cell;
when the load of the first cell is greater than or equal to a second load threshold, split the first cell according to the signal strength of the remote radio units RRUs, to obtain multiple split cells each comprising at least one RRU, so that load of the split cell is less than the second load threshold, wherein the second load threshold is greater than the first load threshold;
select and split two RRUs of the first cell to obtain a first split cell, wherein a sum of load of the two RRUs is less than the second load threshold and the two RRUs have the strongest signal interference;
when a sum of load of remaining RRUs of the first cell is less than the second load threshold, use the remaining RRUs as a second split cell;
when the sum of the load of the remaining RRUs of the first cell is greater than or equal to the second load threshold, combine an RRU, whose load plus load of the first split cell is less than the second load threshold and which has the strongest signal interference to the first split cell, of the remaining RRUs of the first cell with the first split cell; and
repeatedly perform a step of combining an RRU of remaining RRUs of the first cell with the first split cell, wherein a sum of load of the RRU and load of the first split cell combined with an RRU is less than the second load threshold and the RRU has the strongest signal interference to the first split cell combined with an RRU, until a sum of load of remaining RRUs of the first cell is less than the second load threshold, wherein the remaining RRUs of the first cell are RRUs of the first cell except an RRU that is combined.

8. A control apparatus, comprising:
at least one processor and a memory coupled to the at least one processor, wherein the at least one processor is configured to:
when it is determined that network quality of a first cell of multiple cells within coverage of a baseband unit (BBU) decreases, determine load information of the first cell;
when load of the first cell is less than or equal to a first load threshold, determine, according to signal strength of remote radio units (RRUs), a second cell, having the strongest signal interference to the first cell, of neighboring cells of the first cell; and
combine an RRU of the first cell with an RRU of the second cell to obtain a combined cell; wherein:
the apparatus further comprises a transmitter configured to obtain the signal strength of all the RRUs from multiple measurement reports reported by a mobile terminal, wherein the multiple measurement reports comprise measurement reports reported by multiple mobile terminals during signal measurement; and
the at least one processor is configured to:
when the load of the first cell is less than or equal to the first load threshold, calculate a ratio of signal strength of the first cell to signal strength of each neighboring cell of the first cell in each measurement report, wherein signal strength of a cell in each measurement report is a sum of signal strength of all RRUs belonging to the same cell in the measurement report,
accumulate a ratio, of the signal strength of the first cell to signal strength of a same neighboring cell in each measurement report to obtain a sum, and use the sum as strength of signal interference between the first cell and the neighboring cell, and
determine, according to the strength, of signal interference between the first cell and each neighboring cell, the second cell having the strongest signal interference to the first cell.

* * * * *